(12) United States Patent
Garrard et al.

(10) Patent No.: US 9,970,405 B2
(45) Date of Patent: May 15, 2018

(54) METHOD AND APPARATUS FOR DETERMINING A VALUE OF A VARIABLE PARAMETER

(71) Applicant: FREESCALE SEMICONDUCTOR, INC., Austin, TX (US)

(72) Inventors: Michael Robert Garrard, Jaywick (GB); William E. Edwards, Ann Arbor, MI (US); John Matthew Hall, Chelsea, MI (US)

(73) Assignee: NXP USA, Inc., Austin, TX (US)

( * ) Notice: Subject to any disclaimer, the term of this patent is extended or adjusted under 35 U.S.C. 154(b) by 0 days. days.

(21) Appl. No.: 15/104,246

(22) PCT Filed: Dec. 16, 2013

(86) PCT No.: PCT/IB2013/060987
§ 371 (c)(1),
(2) Date: Jun. 14, 2016

(87) PCT Pub. No.: WO2015/092480
PCT Pub. Date: Jun. 25, 2015

(65) Prior Publication Data
US 2017/0016423 A1 Jan. 19, 2017

(51) Int. Cl.
*F02P 5/15* (2006.01)
*F02P 5/145* (2006.01)
(Continued)

(52) U.S. Cl.
CPC ............... *F02P 5/1514* (2013.01); *F02P 3/06* (2013.01); *F02P 5/145* (2013.01); *F02P 9/005* (2013.01);
(Continued)

(58) Field of Classification Search
CPC ........ F02P 5/15; F02P 5/00; F02P 5/04; F02P 5/1514; F02P 3/06
(Continued)

(56) References Cited

U.S. PATENT DOCUMENTS 4,889,095 A * 12/1989 Sogawa ................... F02P 5/15
123/406.47
5,584,280 A * 12/1996 Kinoshita ............... F02P 1/086
123/406.57

(Continued)

FOREIGN PATENT DOCUMENTS

EP          0989301 A2    3/2000
KR       10-0180410 B1    3/1999
(Continued)

OTHER PUBLICATIONS

International Search Report for application No. PCT/IB2013/060987, dated Sep. 29, 2014, 14 pages.

*Primary Examiner* — Mahmoud Gimie

(57) ABSTRACT

A control methodology and apparatus for an engine suitable for use in capacitor discharge ignition systems for internal combustion engines or brushless DC motors is provided, which make use of a simple logic block to determine for instance an ignition timing advance angle or duty cycle signal based on actual engine speed versus engine control parameter data stored in a table, which is a read-only memory, preferably configurable. To minimize memory space, a small number of values of engine control parameter versus engine speed are stored in the table and the logic block determines the required engine control signal for a measured value of engine speed by an interpolation process, preferably linear interpolation.

11 Claims, 5 Drawing Sheets

(51) Int. Cl.
- *F02P 9/00* (2006.01)
- *F02P 3/06* (2006.01)
- *G01P 3/36* (2006.01)
- *G01P 3/44* (2006.01)
- *H02P 6/16* (2016.01)
- *H02P 27/08* (2006.01)
- *F02P 5/00* (2006.01)
- *F02D 41/24* (2006.01)

(52) U.S. Cl.
CPC .................. *G01P 3/36* (2013.01); *G01P 3/44* (2013.01); *H02P 6/16* (2013.01); *H02P 27/08* (2013.01); *F02D 41/2416* (2013.01); *F02D 2400/06* (2013.01); *Y02T 10/46* (2013.01)

(58) Field of Classification Search
USPC ............... 123/406.59, 406.6, 406.64, 406.66
See application file for complete search history.

(56) References Cited

U.S. PATENT DOCUMENTS

| | | | |
|---|---|---|---|
| 2001/0045204 A1* | 11/2001 | Shidara | F02B 61/045 123/406.59 |
| 2007/0235007 A1 | 10/2007 | Yasui et al. | |
| 2009/0012699 A1* | 1/2009 | Bahner | F02D 41/2422 701/105 |
| 2009/0055074 A1 | 2/2009 | Ishiguro et al. | |
| 2012/0304966 A1* | 12/2012 | Fong | F02P 9/005 123/406.23 |

FOREIGN PATENT DOCUMENTS

| | | |
|---|---|---|
| KR | 10-0394657 B1 | 8/2003 |
| KR | 20040041349 A | 5/2004 |

* cited by examiner

FIG. 1- PRIOR ART

METHOD AND APPARATUS FOR DETERMINING A VALUE OF A VARIABLE PARAMETER

FIELD OF THE INVENTION

This invention relates to a method and apparatus for determining ignition timing control in an internal combustion engine in particular an ignition timing advance angle. The invention is particularly, though not exclusively, applicable to the control of ignition timing in capacitor discharge ignition systems used on engines for motorcycles and tools such as lawn mowers, vegetation blowers and generators, for example.

BACKGROUND OF THE INVENTION

The most prevalent method of controlling spark-ignited IC engines in practice is to use one or more sensors for interpreting engine operating conditions, and choose ignition timing based on such interpreted engine operating conditions using a pre-calibrated map stored in an electronic control unit that controls the ignition timing. The map stored in memory of the electronic control unit is typically constructed using a set of calibration experiments on a set of sample engines that are representative of engines on which such ignition system is to be deployed. A typical capacitor discharge ignition type system for controlling ignition timing in an internal combustion engine is illustrated in FIG. 1 and a similar system is described in EP 0989301 A. FIG. 1 shows a capacitor discharge ignition (CDI) type engine ignition system for conducting such ignition timing control using a Central Processing Unit (CPU) 100. Typically, engine ignition systems conduct ignition timing control depending on engine rotational speed. A voltage supply 101 provides a voltage to an ignition unit 102 and the CPU 100. A capacitor 103 in the ignition unit is charged by the supply voltage. When an ignition signal generated the CPU 100 turns on a Silicon Controlled Rectifier (SCR) 104 in the ignition unit 102, the capacitor 103 is discharged and its energy is dumped into an ignition coil 105, generating a spark at a spark plug 106. Signals from a crankshaft speed and position sensor 107 are input to the CPU 100 which, in response to these signals, supplies ignition signals to the ignition unit with an appropriate timing so that using a crankshaft position as a reference, the spark plug sparks at the appropriate crankshaft position. Typically, the spark is timed to occur a few degrees of crankshaft rotation before "top dead centre" (TDC). To maintain optimum engine performance, the timing advance needs to be increased with increasing engine speed although the relationship is not necessarily linear. In general, the CPU 100 operates based on program and control data also referred to as an "ignition map". Both the program and the control data are stored in a memory. Such memory can comprise, for example, a rewritable memory such as an EEPROM. It is common for the memory and the CPU to be integrally packaged together. These known systems which require inter alia a battery, a CPU and re-writable memory have the disadvantages of cost, size and complexity. This makes such systems especially unattractive for use in low-cost equipment such as tools or motorcycles.

Accordingly, low-cost equipment is still quipped with internal combustion engines making use of mechanical based system to set ignition timing and advance. Known mechanical ignition timing systems comprise inter alia distributor ignition systems and magneto ignition systems. Although, such mechanical ignition timing systems are still widely used they are subjected to several drawbacks. For instance, parts of the mechanics of the mechanical ignition timing systems are specifically adapted to an internal combustion engine. Any adjustments and/or changes required thereof are time- and cost-consuming.

SUMMARY OF THE INVENTION

The present invention provides a method and apparatus for determining an engine control parameter such as ignition timing (or ignition timing advance angle) of an internal combustion (IC) engine or a duty cycle signal for a brushless DC motor as a function of a signal relating to an actual (rotational) speed as described in the accompanying claims.

According to an aspect of the present invention, a control methodology and apparatus for an engine suitable for use in capacitor discharge ignition systems for internal combustion engines or brushless DC motors is provided, which make use of a simple logic block to determine for instance an ignition timing advance angle or duty cycle signal based on actual engine speed versus engine control parameter data stored in a table, which is a read-only memory, preferably configurable. To minimise memory space, a small number of values of engine control parameter versus engine speed are stored in the table and the logic block determines the required engine control signal for a measured value of engine speed by an interpolation process, preferably linear interpolation.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
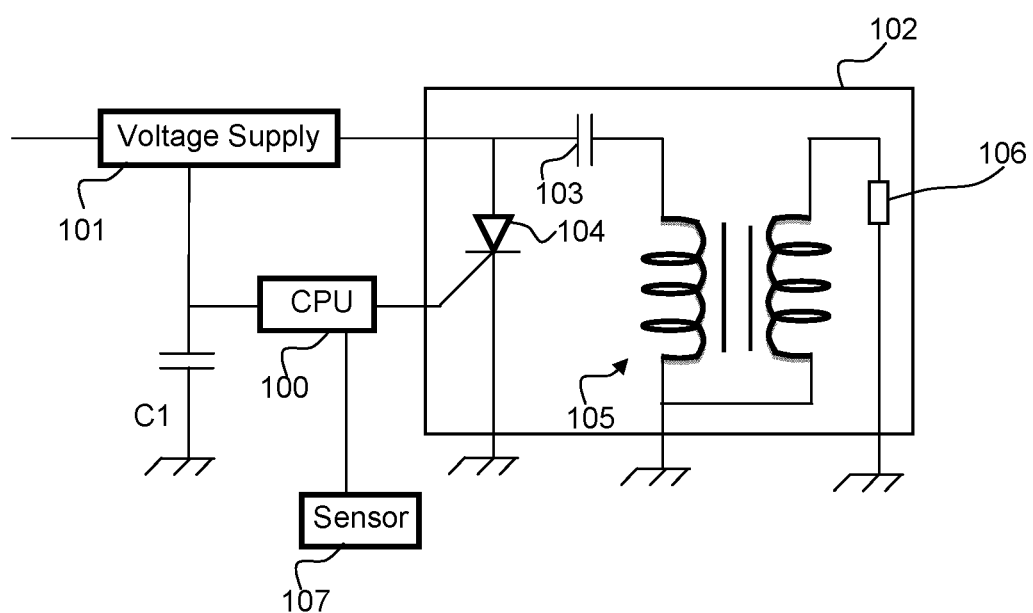
FIG. 1 is a simplified block diagram of a known ignition control system.
Figure 2:
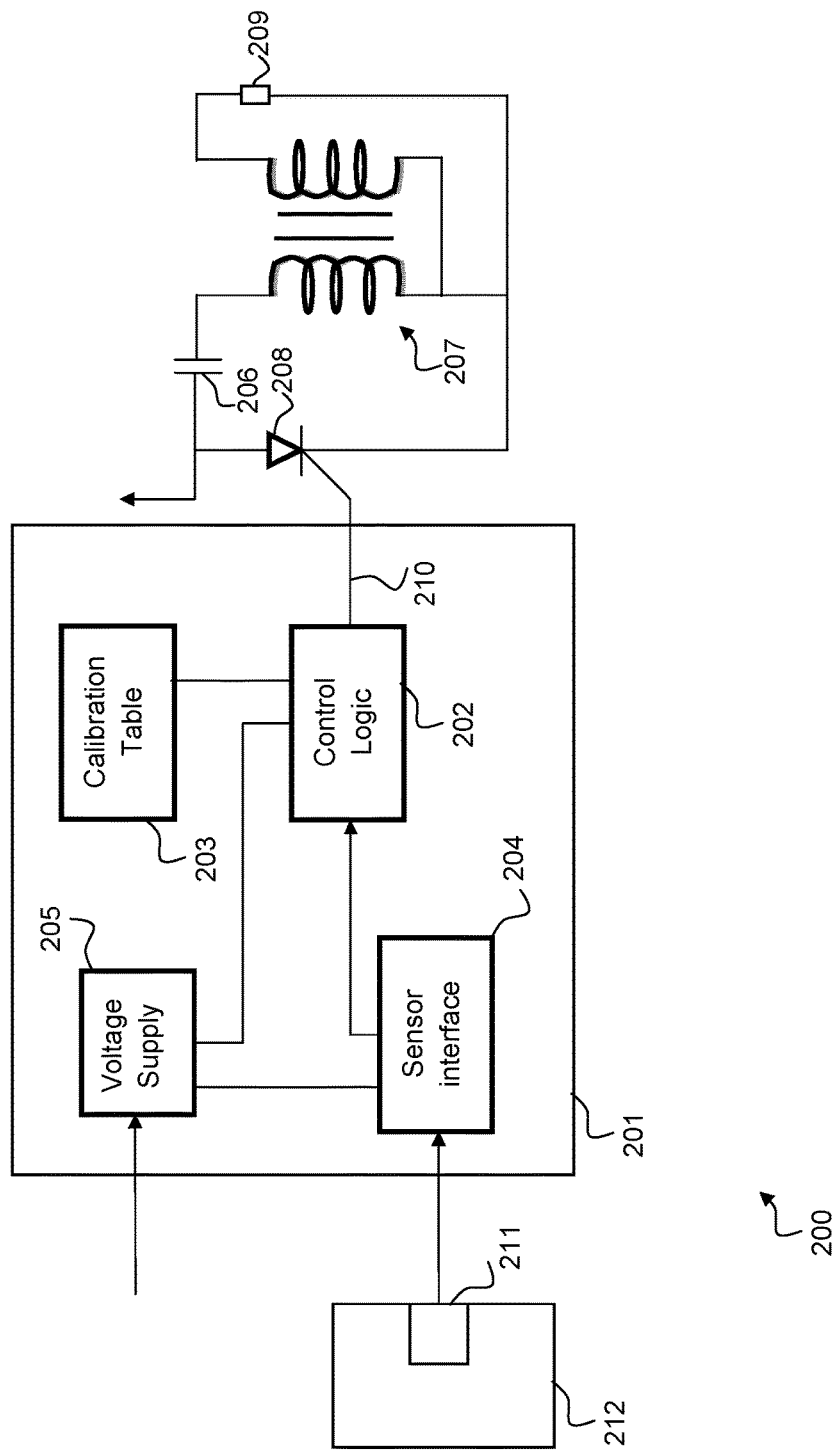
FIG. 2 is a simplified block diagram of an ignition timing control system suitable for use with an internal combustion engine according to an embodiment of the present invention.

With reference to FIG. 2, a system 200 for controlling ignition timing in an internal combustion engine of a machine such as a lawn mower may comprise control apparatus 201 which includes a control logic module 202 operably coupled to a calibration table 203. The control logic module 202 is a finite-state machine implemented on the basis of a fixed or fixedly coded logic. The control apparatus may be arranged to determine a value of an ignition timing of an internal combustion engine as a function of a variable parameter relating to engine speed, e.g. the rotational engine speed measured in number of revolutions per time unit. In the example of FIG. 2, the ignition timing is an ignition timing advance angle defined in degree and the engine speed is a rotational engine speed defined in number of revolutions per minute (RPM). In one embodiment, the calibration table 203 may be integrated with the control logic module 202. The control apparatus 201 may also comprise or operably coupled to a sensor interface circuit 204 whose output is operably coupled to an input of the control logic module 202. An input of the sensor interface circuit 204 is operably coupled to an output of a sensor which generates an output relating to engine (or crankshaft) speed, in revolutions per minute (RPM), for example, and engine crankshaft angular position relative to some pre-fixed datum. Electrical power may be provided to the sensor interface circuit 204 and to the control logic module 202 by a voltage supply circuit 205 which may form a part of the control apparatus 201 and which may receive power from an external supply (not shown). Such an external supply of power is typically provided by a high voltage alternator coil which may be built into the flywheel of the engine.

In the example of a CDI system, the high voltage alternator coil may also supply the electrical current required for charging an ignition capacitor 206 whose energy is discharged into an ignition coil 207 when for instance an Silicon Controlled Rectifier (SCR) 208 is turned on, thereby causing a spark to occur across a spark plug 209, for example.

Signals from the sensor interface circuit 204, which provide information relating to crankshaft/engine speed and crankshaft position derived from an external sensor, is input to the control logic module 202 which may be arranged to determine an ignition timing advance angle in a manner to be described and to subsequently generate a spark event signal, on an output line 210, which turns on the SCR 208.

In one embodiment, the sensor for sensing engine speed and crankshaft position may be a variable reluctance sensor (VRS) 211 attached to an engine 212 at a convenient location. Such sensors are known and essentially consist of a coil wrapped around a permanent magnet. When a ferromagnetic material, such as tooth which protrudes from a flywheel associated with the engine's crankshaft, passes the sensor, the magnetic field is disturbed and an AC voltage is generated. The amplitude and frequency of the generated AC signal depends on the speed of the flywheel. Crankshaft position information may also be determined from this signal if the width of the tooth and its alignment relative to some fixed datum on the engine are known. For example, in the simple case of a single cylinder engine and a flywheel having one tooth (which may typically have an angular width of 55 degrees for example), the datum point could be a trailing edge of the tooth being aligned with the sensor when the engine position is at TDC. Other alignment points could be a leading edge of the tooth or the centre of the tooth, for example. In other examples the flywheel may be provided with multiple teeth, 24 or 36 for example. A datum may be established in these examples by having a gap between two teeth. The AC signal from the sensor may be processed further to obtain a digital output. As the output of a VRS is an analogue signal which is roughly sinusoidal, an interface circuit is usually employed in order to condition the analogue output signal so that it is digitally readable. Hence the sensor interface circuit 204 may be arranged to condition the VRS output and to provide information relating to engine RPM and crankshaft position in a digital form which is readable by the control logic module 202 and may comprise conventional circuitry for doing this.

In alternative embodiments, other sensors may be used to provide information relating to engine speed and crankshaft position to the control logic module 202. Examples of alternative sensors are a Hall Effect sensor, optical or inductive sensor.

Operation of the control logic module 202 will now be described in more detail. From the signal supplied by the sensor interface circuit 204, the control logic module 202 may record an engine speed (RPM). Also from the signal supplied by the sensor interface circuit 204, the control logic module 204 may use the width of the signal (relating to the width of the tooth) to adjust the scheduling of a spark event signal, this width providing an engine speed signal that is closer in time to the spark event and thus a more accurate representation of engine speed. In the case of a four-stroke engine, this engine speed can be used to determine whether the engine is on the compression or exhaust cycle and thus permit sparking every 720 degrees of crankshaft angle. The control logic module 204 may also use the width of the signal in order to discriminate against noise in the signal which may emulate an edge of the tooth passing the VRS 211. In one example, based on engine speed, and detection of a leading edge of the VRS signal, the control logic module 202 may be arranged to determine an appropriate timing advance angle from data retrieved from the calibration table 203 and subsequently, to generate a spark event signal so that a spark occurs at the correct crankshaft angle. In one embodiment, if the control logic module 202 should be disabled (due to absence of a sufficient voltage supply, for example such as might occur at very low engine speed), the control apparatus 201 may be arranged to apply the output of the sensor interface circuit 204 directly to the SCR 208. In this example, the control apparatus 201 may be arranged to trigger the SCR 208 on each trailing edge of the sensor interface circuit's output.

In order to obviate the need for a central processing unit and large memory containing a look up table of ignition timing advance angles dependent on a set of measurement values reflecting the engine condition measured during operation of the engine in the operating range thereof, the calibration table 203 may be pre-configured with a limited number of "ignition timing angle advance versus engine speed" data points and the control logic module 202 may be configured to determine a value for timing advance angle at any given engine speed by interpolating between two selected data points, which are consecutive with respect to the engine speed (or abscissa value).

The calibration table 203 may comprise an EEPROM (electrically erasable programmable read only memory) for example and may be pre-configured in accordance with conventional methods. Other types of memory may also be employed such as flash memory, for example. In one embodiment, the calibration table may be pre-configured using a fuse coding scheme. Electrical fuses are well known. (See for example, US 2013/0208526). A fuse can be thought of as a "one time configurable device". One of the most commonly used fuses is a CMOS gate. A fuse may be configured by applying a high voltage to induce a high current to flow therethrough. When a high current flows through the fuse, by turning on a program selector, the fuse can be configured, or burned into a high resistance state. Although fusses tend to be physically larger than EEPROM memory cells, they have the advantage that they can be manufactured together with the control logic using the standard logic processes and this results in a lower cost semiconductor device.

Figure 3:
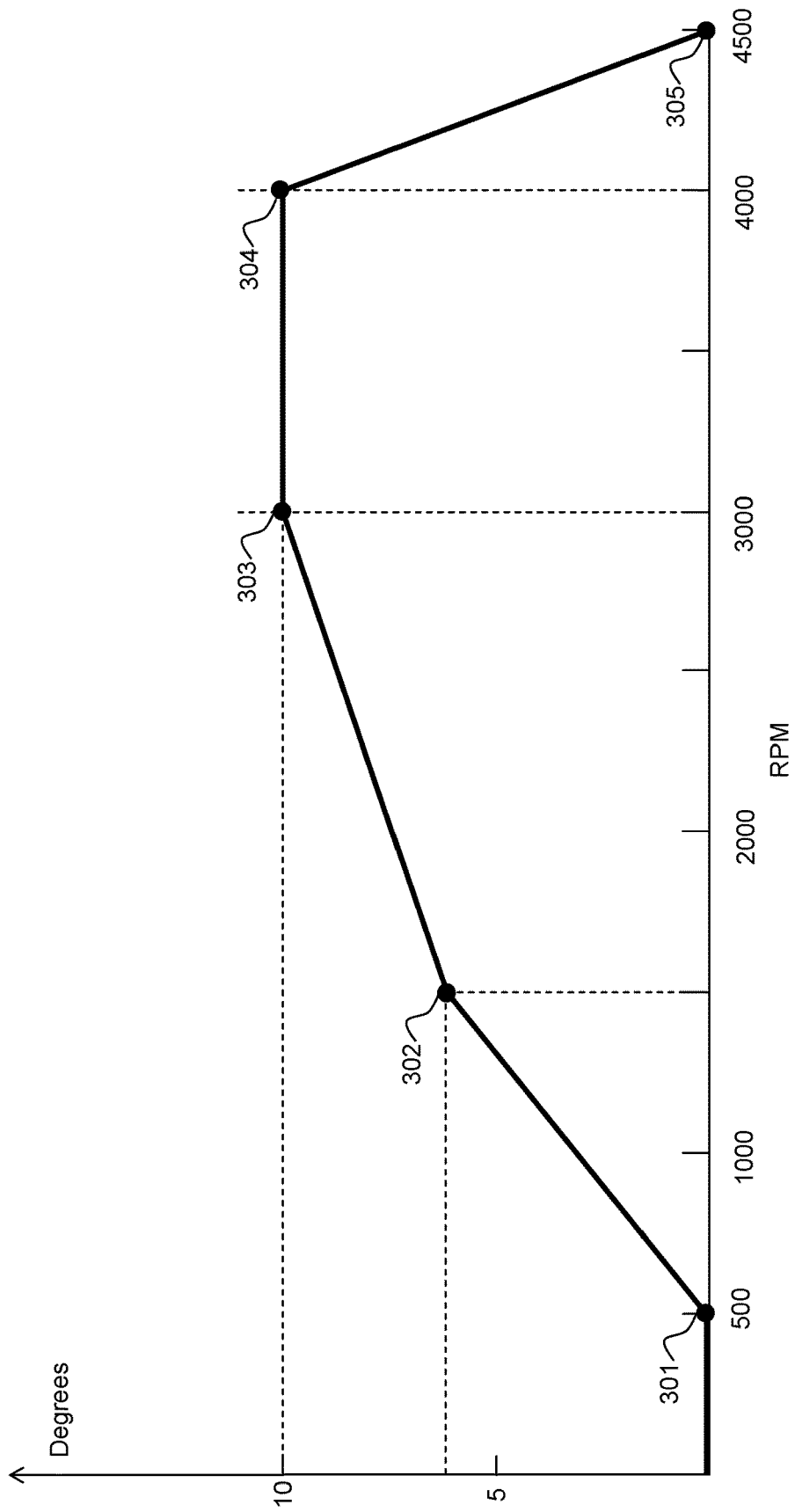
FIG. 3 is a graph of ignition timing advance angle versus engine speed according to an embodiment of the present invention.

As mentioned above, an optimum ignition timing advance angle varies with engine speed and usually in a non-linear fashion. From engine testing procedures, ignition timing angle advance as a function of engine speed may be determined and a curve may be drawn representing this function. FIG. 3 shows an approximation to such a curve and drawn using just five co-ordinates; namely for engine speeds of 500 RPM, 1500 RPM, 3000 RPM, 4000 RPM and 4500 RPM. The values for ignition timing advance angle for these engine speed values are plotted on the curve of FIG. 3 and shown as "data points" 301, 302, 303, 304 and 305, respectively, for the sake of illustration. Linear interpolation is used to join consecutive data points in order to approximate the actual ignition timing advance angle versus engine speed function. So, in this example, at rotational cranking speeds, between zero and 500 RPM, the timing advance angle is zero. As already described above, the control logic module may be idle in this region of the engine speed and the control apparatus 201 of the system 200 for controlling ignition timing may be arranged to apply the output of the sensor or the output of the sensor interface circuit 204 directly to the SCR 208. In this example, the control apparatus 201 may be arranged to trigger the SCR 208 on each trailing edge of the sensor interface circuit's output. It should be understood that another pre-defined alignment datum may be used to trigger the SCR 208, likewise. Between a data point 301 where the engine speed equals 500 RPM and a data point 302 where the engine speed equals 1500 RPM, the ignition timing advance angle increases up to for instance 6 degrees. In accordance with the linear interpolation methodology applied in the present embodiment, the ignition timing advance angle increases linearly with a first constant gradient. Between data point 302 and a data point 303 where the engine speed equals 3000 RPM, the ignition timing advance angle increases up to for example 10 degrees. In accordance with the linear interpolation methodology applied in the present embodiment, the ignition timing advance angle increases linearly with a second constant gradient. Between data point 303 and a data point 304 where engine speed equals 4000 RPM, the ignition timing advance angle remains constant at for example 10 degrees. Between data point 304 and a data point 305 where the engine speed equals 4500 RPM, ignition timing advance angle decreases down to for example zero degrees in order to provide a soft limit on engine speed also designed as "soft" governor. The implementation of a soft governor defining a region with decreasing ignition timing advance angle at increasing engine speed, may eliminate for instance the implementation of a fuel cut off to the carburetor. In this example, 4500 RPM may be the maximum permitted engine speed. The data point relating to the maximum engine speed, herein 4500 RPM as an illustrative example, may be provided by a definition of the maximum speed engine and a pre-defined or fixedly defined ignition timing advance angle to be used when the engine runs at its maximum speed. An example thereof is illustrated below with reference to an exemplary coding of a configuration table.

In one example embodiment, the co-ordinates of each of the five data points (which may be thought of as "break points") are stored in the calibration table 203. The control logic module 202 may be arranged to interpolate values for ignition timing advance angles for any engine speed whose value lies on or between any stored data point. In one example, the control logic module 202 may be configured to apply piece-wise linear function including the break points as supporting points. Piece-wise linear interpolation is known. A piece-wise linear curve is specified by a series of points, for example the data points 301-305 of FIG. 3, which are sometimes referred to as vertices, between which linear interpolation is applied. This means that the resulting curve then consists of line segments connecting consecutive vertices. The control logic module 202 may thus be arranged to follow the linear interpolation shown in FIG. 3 between data points, in order to determine an ignition timing advance angle at a given (currently measured) speed of the engine.

In some embodiments, instead of using a piece-wise linear function, a proportional-integral-differential (PID) controller may be used instead.

In some embodiments, additional data may be stored in the calibration table 203 for use by the control logic module 202.

The additional data should comprise engine specific parameter such that the system 200 for controlling ignition timing and control logic module 202, respectively, according to any embodiment of the present invention is applicable to a wide range of internal combustion engines enabling to replace mechanical based ignition timing systems typically implemented therein. Moreover, in order to meet low cost and less complexity requirements, the amount of data provided in the calibration table 203 should be as less as possible without limiting the applicability of the system 200 for controlling ignition timing according to any embodiment of the present invention allowing for replacing known mechanical based ignition timing systems.

Such additional data may comprise, for example, flywheel tooth (angular) width and maximum permitted engine speed.

The maximum permitted engine speed and/or the flywheel tooth (angular) width may be defined as scale values. The flywheel tooth (angular) width results from multiplying the defined width scale value and a predefined angular scale factor. The maximum permitted engine speed results from multiplying the defined maximum permitted speed scale value and a predefined speed scale factor. The use of scale factors reduces the amount of storage required for the scale values. The scale factors define the resolution when coding the scale values as integer values. In an example, the scale factors are predefined in the fixed logic of the control logic module 202.

The additional data may also comprise information relating to the reference of point or rotational alignment in relationship to which the ignition timing advance angle is defined, for instance as described with reference to the variable reluctance sensor (VRS) 211 above, whether the leading or trailing edge of the flywheel tooth represents the reference of rotational alignment. Please note that in some examples, the very first spark event signal may require at least one full crankshaft rotation when referencing from the leading edge, and one whole tooth when referencing from the trailing edge.

In another embodiment, the control logic module 202 may be arranged to cease scheduling spark events when engine speed reaches or exceeds the permitted maximum. In this way, the control logic module 202 may act as an engine speed limiter or "hard" governor. Hysteresis control logic may be implemented to control cessation and resumption scheduling spark events. The hysteresis control logic may have a predefined engine speed width, e.g. 50 RPM, to prevent unwanted rapid switching between cessation and resumption of the scheduling of the spark events at permitted maximum engine speed.

In some example embodiments the engine speed of the data points stored in the calibration table may be defined as a relative value in relationship to the maximum permitted engine speed; e.g. the engine speed may be defined as a percentage value of the maximum permitted engine speed. In this way, the same storage capacity may be used for engines having substantially different maximum permitted engine speeds such as for a lawn mower engine having a maximum permitted engine speed of 4.000 RPM as a motorcycle having a maximum permitted engine speed of 18.000 RPM.

As mentioned above, the calibration table may be configured and coded to save the required storage capacity, in particular applicable when using fuse coding of the calibration table but not limited thereto. An example of a coding scheme may include the following:

six bits are provided to specify the flywheel tooth width value with respect to a predefined width scale factor of one degree, for instance, which means that the flywheel tooth width may be configured in the range from 0 degree to 63 degree at the resolution of the width scale factor (e.g. 1 degree);

one bit is provided to specify whether to generate the spark event signal with reference to the leading or trailing edge of the flywheel tooth;

six bits are provided to specify the maximum permitted engine speed value with respect to a predefined speed scale factor of 500 RPM, for instance, which means that the maximum permitted engine speed may be configured in the range of 0 to 31.500 RPM (0 to 63*500 RPM) at a resolution of the speed scale factor (e.g. 500 RPM); and thirteen bits for each break point.

Following coding may be used for a break point:

seven bits are provided to specify a speed engine value with respect to a speed scale factor or as a relative speed value with respect to the reference value; for instance, the speed engine value may be defined as a percentage value relative to the maximum engine speed, which means that speed engine value may be selected from the range of 0% to 100% at a resolution of 1%, e.g. 1%-point corresponds to 120 RPM for a maximum engine speed of 12,000 RPM; and six bits are provided to specify an ignition timing advance angle value with respect to a angle scale factor of one degree, for instance, which means that the ignition timing advance angle may be configured in the range from 0 degree to 63 degree at the resolution of the angle scale factor (e.g. 1 degree) after chosen angular alignment reference, for instance the leading of trailing edge of the flywheel tooth.

Set to all zeroes for unused break points. In some embodiments there may be sufficient break points for the most complex desired spark function. When applied to a less complicated function, the control logic may be instructed to ignore break points if the value set was, for example, all zeros.

In another example, the coding scheme may further include the following:

an indication that the generation of the spark events is to be ceased engine speed reaches or exceeds the permitted maximum, the indication may comprise for instance one bit or 6 bits allowing for specifying the hysteresis width of the engine speed limiter; and a field for specifying a fixed ignition timing advance angle to be used below the first break point, the field may comprise 6 bits to specify the fixed ignition timing advance angle value with respect to a angle scale factor of one degree, for instance, which means that the fixed ignition timing advance angle may be configured in the range from 0 degree to 63 degree at the resolution of the angle scale factor (e.g. 1 degree), in an example, the a fixed ignition timing advance angle value equal to 63 may be reserved to indicate that the spark event signal generated on predefined fixed datum of the crankshaft position such as the trailing edge of the flywheel tooth.

In accordance with the above coding example, it is understood that a system for controlling ignition timing and control logic module, respectively, applicable to a wide range of internal combustion engines is realizable. For instance, a system for controlling ignition timing performing fixed timing of a magneto ignition system with engine over-speed limiter ("hard" governor) would require two break points resulting in total to an amount of data of 13 bits+(2*13) bits=39 bits; a system for controlling ignition timing performing fixed timing of a distributor ignition system with engine over-speed limiter ("hard" governor) would require four break points resulting in total to an amount of data of 13 bits+(4*13) bits=65 bits; and a more complete system for controlling ignition timing with "soft" governor and engine over-speed limiter ("hard" governor) may require six break points resulting in total to an amount of data of 13 bits+(6*13) bits+13 bits=104 bits.

Figure 4:
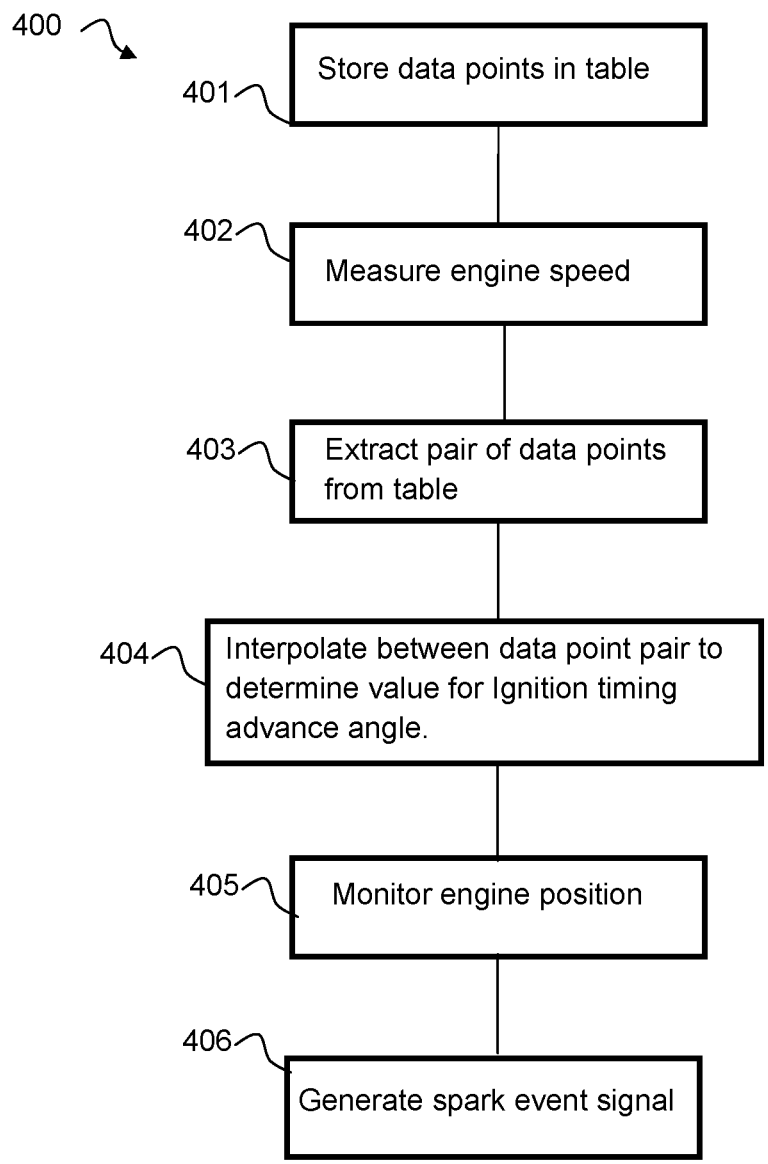
FIG. 4 is a simplified flowchart of an exemplary method for control of ignition timing suitable for use in an internal combustion engine according to an embodiment of the present invention.

An example of a method for determining a value of the ignition timing will now be described with reference to the simplified flowchart of FIG. 4 in the context of determining an ignition timing advance angle for an internal combustion engine. The method may be used for controlling the ignition timing of an internal combustion engine which comprises a capacitor discharge ignition system. The engine may be used in a machine such as a lawn mower or motorcycle, for example.

At 401, a set of data points may be initially pre-configured and provided in a calibration table. A data point may comprise a value of the ignition timing of an internal combustion engine versus a value of a variable parameter relating to engine speed where the ignition timing is a function of the variable parameter relating to engine speed. In this example, the ignition timing may be an ignition timing advance angle. The variable parameter relating to engine speed may be rotational engine speed, for example measured in revolutions per time unit.

At 402, a measurement of the variable parameter relating to engine speed may be received. In this example, where the variable parameter is rotational engine speed, a value of engine speed may be determined by the control logic module 202 using a digital counter and a signal from a remote sensor.

At 403, two consecutive data points closest lower and closest upper to the measured value of the variable parameter relating to the engine speed may be extracted from the calibration table. So for example, if the rotational engine speed is measured to be 1500 RPM and the data points stored related to values of engine speed of 500 RPM, 1000 RPM, 2000 RPM and 4000 RPM, then the data points at engine speeds of 1000 RPM and 2000 RPM are selected and their corresponding values, ignition timing advance angles in this example, are noted.

At 404, a value for ignition timing advance angle at an engine speed of 1500 RPM may be determined by interpolating between the two extracted data points. In one example, the interpolation may be performed using linear interpolation of the extracted data points. This means that the ignition timing advance angle versus engine speed is modelled as a piece wise linear function.

At 405, an engine position may be monitored by receiving measurements of engine position from a remote sensor. The monitoring of the engine position may allow for determining a reference of rotational alignment in relationship to which the ignition timing advance angle is defined.

At 406, an ignition control signal comprising a "spark event signal" may be generated at a point in time depending on engine position and the determined value of ignition timing advance angle.

In the example of a capacitor discharge ignition system, the spark event signal may be used to turn on a silicon controlled rectifier which may be arranged to cause a charged capacitor to discharge into an ignition coil connected across a spark plug.

Other embodiments may also include an engine load measurement from a throttle or pressure sensor along with a load based modifying factor which may be applied to the ignition timing and the ignition timing advance angle, respectively. The invention may also be applied to control of, for example, a cold start enrichment solenoid or fuel control solenoid on an electronic carburetor.

While the specific embodiments have been described in the context of control of ignition timing in an internal combustion engine, it will be understood that the applicability of the invention is not so-limited. In general, the invention may also find application on other systems where it is required to determine a value of one control parameter which is a function of a measurable parameter and especially where cost and memory space are limited. There are many such examples today that use simple mechanical control, and which are also available with full electronic control using a microcontroller and software.

Form the above description, those skill in the art understand that the ignition control apparatus 201 for an internal combustion engine according to an embodiment of the present invention suitable for use in capacitor discharge ignition systems 206, 207 uses a simple logic block 202 to determine an ignition timing advance angle based on engine speed versus ignition timing advance angle data stored in a table 203. To minimise memory space, a small number of values of ignition timing advance angle versus engine speed are stored in the table and the logic block determined the required ignition timing advance angle for a measured value of engine speed by a linear interpolation process. Preferably, the storage to store information of the table and the logic of the aforementioned ignition control apparatus are implemented on the basis of the so-called SmartMos technology thereby providing an economical beneficial implementation. The SmartMos technology allows to combine High-Density Technique MOS and discrete FETs for high current capacity combining precision analogue, high voltage, high current power capabilities and high speed CMOS in a single package.

It is further understood by those skilled in the art that the above described logic and control methodology may be also applied for further usages and application such as a control of a brushless DC motor.

The brushless DC Motor or the BLDC Motor is a rotating electric motor consisting of stator armature windings and rotor permanent magnets, whereas in a conventional brushed DC motor the stator is made up of permanent magnets and rotor consists of armature windings. The conventional brushed DC motor commutes itself with the use of a mechanical commutator whereas brushless DC motor needs electronic commutation for the direction control of current through the windings. Typically and for the sake of illustration, BLDC motors have three phase windings that are wound in star or delta fashion and need a three phase inverter bridge for the electronic commutation. For proper commutation, the absolute rotor position information is crucial in order to produce the synchronized voltage waveforms to the motor. To get position information, the brushless DC motors may be equipped with Encoders, Resolvers or Hall sensors. In closed loop speed control, the set speed and the actual speed are compared and the error is fed to a controller of the brushless DC motor, which outputs the required duty cycle in order to achieve the required speed operation of the motor.

Conventionally, the regulation of speed is done with the PI (proportional and integral) or PID (proportional, integral and derivative) controller. The error difference between the actual speed and reference speed is calculated at every PWM cycle and is given as an input to the PI or PID controller. The proportional, integral and eventually derivative gains of the PI or PID controller may be configurable using commands.

Figure 5:
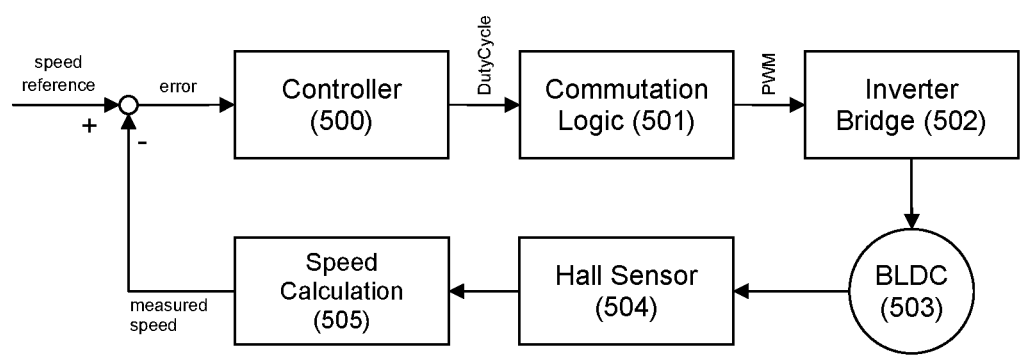
FIG. 5 shows an exemplary embodiment of a closed-loop control for a brushless DC motor according to an embodiment of the present invention.

It is well understood that the interpolation methodology described above with reference to the control of ignition timing in an internal combustion engine is likewise applicable to generate the output of a controller for brushless DC motors. The table providing several data points between which interpolation is applied forms the basis of a piecewise curve of the required duty cycle as a function of the error between reference speed and the measured actual speed of the brushless DC motor. FIG. 5 shows an exemplary embodiment of a closed-loop control for a brushless DC motor 503, which comprises a controller 500, a commutation logic 501 and an inverter bridge 502. The actual speed of the BLDC motor 503 is determined by a signal generated by a hall sensor 504 and a speed calculation circuit 505. The difference between the measured speed and the reference speed (i.e. the desired speed) is fed into the controller 500, which applies the above described interpolation methodology to determine the duty cycle signal as a function of the speed difference signal or error signal.

Using the aforementioned SmartMos technology the functional units shown exemplarily in FIG. 5 involved in the controlling of the rotational speed of the BLDC motor 503 may be implemented in a single package thereby providing an economical beneficial implementation.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

In the foregoing specification, the invention has been described with reference to specific examples of embodiments of the invention. It will, however, be evident that various modifications and changes may be made therein without departing from the broader spirit and scope of the invention as set forth in the appended claims. For example the discrete modules and circuits shown in FIG. 2 are so shown for illustrative purposes and the functionality of each module may be combined with one or more other modules. For example, any or all of the modules comprising the control apparatus 201 of FIG. 2 comprising the voltage supply circuit 205, sensor interface circuit 204, control logic module 202 and calibration table 203 may be implemented in an ASIC (application specific integrated circuit). As a further example, the control logic module 202 and calibration table 203 may be included in a single module. Such a module may be implemented in logic.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Further, the entire functionality of the control apparatus 201 shown in FIG. 2 may be implemented in an integrated circuit. Alternatively the functionality of the control logic module 202 and the calibration table 203 may be implemented in an integrated circuit Such an integrated circuit may be a package containing one or more dies. Alternatively, the examples may be implemented as any number of separate integrated circuits or separate devices interconnected with each other in a suitable manner. For example, an integrated circuit device may comprise one or more dies in a single package with electronic components provided on the dies that form the modules and which are connectable to other components outside the package through suitable connections such as pins of the package and bondwires between the pins and the dies.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word "comprising" does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method for determining an engine control parameter as a function of a variable parameter relating to an engine speed, the method comprising:
   providing in a table, a set of data points, each data point comprising a value of the variable parameter relating to engine speed and a value of the engine control parameter corresponding thereto in accordance with said function, wherein said table further comprises a value relating to a maximum permitted engine speed, and said value of the variable parameter relating to the engine speed of each data point defines a rotational engine speed as a scalable value of the maximum engine speed,
   initially storing said table by implementing a fuse coding scheme,
   receiving a measured value of the variable parameter relating to the engine speed,
   extracting from the table, two data points from the set of data points which are closest lower and closest upper to the measured value of the variable parameter relating to the engine speed, and
   determining a value of the engine control parameter by interpolating between the extracted two data points.

2. The method of claim 1, wherein interpolating between the extracted two data points is performed using linear interpolation, wherein said extracted two data points are consecutive, in particular the two extracted data points are closest lower and closest upper to the measured value of the variable parameter relating to the engine speed.

3. The method of claim 1, wherein the engine control parameter is an ignition timing advance angle of an internal combustion engine and the variable parameter is a rotational engine speed, wherein the method comprises: monitoring a rotational engine position, and generating an ignition control signal at a point in time depending on said rotational position and a determined value of the ignition timing advance angle.

4. The method of claim 1, wherein a maximum speed of the engine is provided in the table and extractable from the table as a data point comprising a value of the maximum speed as the variable parameter relating to engine speed and a value of the engine control parameter corresponding thereto, wherein the value of the engine control parameter corresponding to the maximum speed is defined in order to limit the engine speed at or at least in the range of the defined maximum speed.

5. The apparatus of claim 1, wherein the logic module is a fixed logic state machine and the table is provided in a read only memory.

6. Apparatus for determining an engine control parameter as a function of a variable parameter relating to an engine speed, the apparatus comprising:
a table for providing a set of data points, each data point comprising a value of the variable parameter relating to the engine speed and a value of the engine control parameter corresponding thereto in accordance with said function, wherein the table is coded via a coding scheme to save storage capacity within a memory, wherein said table further comprises a value relating to a maximum permitted engine speed, and said value of the variable parameter relating to the engine speed of each data point defines a rotational engine speed as a scalable value of the maximum engine speed, and
a logic module arranged to receive a measurement of a value of the variable parameter relating to the engine speed and to extract from the table, two data points from the set of data points which are closest lower and closest upper to the measured value of the variable parameter relating to the engine speed, and to determine a value of the engine control parameter by interpolating between the extracted data points.

7. The apparatus of claim 6, wherein interpolating between the extracted two data points is performed using linear interpolation, wherein said extracted two data points are consecutive, in particular the two extracted data points are closest lower and closest upper to the measured value of the variable parameter relating to the engine speed.

8. The apparatus of claim 6, wherein the engine control parameter is an ignition timing advance angle of an internal combustion engine and the variable parameter is a rotational engine speed, wherein the logic module is arranged to monitor a rotational engine position and to generate an ignition control signal at a point in time depending on the monitored engine position and the determined value of the ignition timing advance angle.

9. The apparatus of claim 6 comprising a sensor interface circuit for conditioning engine speed and position signals received from an external sensor for application to the logic module.

10. The apparatus of claim 9, wherein the engine speed and position signals are received from at least one of a variable reluctance sensor, a Hall Effect sensor, an optical sensor and an inductive sensor.

11. The apparatus of claim 6, wherein the apparatus is implemented in one or more integrated circuit devices.

* * * * *